United States Patent
Novlan et al.

(10) Patent No.: US 11,206,640 B2
(45) Date of Patent: Dec. 21, 2021

(54) PRIVATE LOCAL NETWORK ACCESS, AUTHENTICATION, AND ASSOCIATION FOR 5G OR OTHER NEXT GENERATION NETWORK

(71) Applicant: AT&T Intellectual Property I, L.P., Atlanta, GA (US)

(72) Inventors: Thomas Novlan, Cedar Park, TX (US); Salam Akoum, Austin, TX (US); Milap Majmundar, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/419,466

(22) Filed: May 22, 2019

(65) Prior Publication Data

US 2020/0374839 A1    Nov. 26, 2020

(51) Int. Cl.
*H04W 72/04*    (2009.01)
*H04W 16/16*    (2009.01)
*H04W 12/08*    (2021.01)
*H04L 29/12*    (2006.01)
*H04W 12/06*    (2021.01)
*H04W 92/18*    (2009.01)
(Continued)

(52) U.S. Cl.
CPC ......... *H04W 72/04* (2013.01); *H04L 61/6054* (2013.01); *H04W 12/06* (2013.01); *H04W 12/08* (2013.01); *H04W 16/16* (2013.01); *H04W 88/04* (2013.01); *H04W 88/085* (2013.01); *H04W 92/10* (2013.01); *H04W 92/18* (2013.01)

(58) Field of Classification Search
CPC ..... H04W 72/04; H04W 12/06; H04W 12/08; H04W 16/16; H04W 88/04; H04W 88/085; H04W 92/10; H04W 92/18; H04L 61/6054
See application file for complete search history.

(56) References Cited

U.S. PATENT DOCUMENTS 10,098,138 B1 *  10/2018  Liu ................... H04W 72/1242
10,383,005 B2 *  8/2019   Lee .......................... H04B 7/14
(Continued)

FOREIGN PATENT DOCUMENTS

EP          18197384.3          9/2018

OTHER PUBLICATIONS

Wang, et al., "Wireless Communication Framework for Multiple User Equipment," U.S. Appl. No. 16/004,811, filed Jun. 11, 2018, 51 pages.
(Continued)

*Primary Examiner* — Khawar Iqbal
(74) *Attorney, Agent, or Firm* — Amin, Turocy & Watson, LLP

(57) ABSTRACT

Access and user association can be enabled for private and hybrid public/private 5G new radio (NR) networks. More specifically, this disclosure discloses how to perform initial access, user authentication and association, Internet protocol (IP) address assignment for routing, and/or mobility management. The aforementioned process can facilitate the user equipment (UE) to engage in peer-to-peer, local breakout, and private/public network communication, via a local manager (LM) access point, without requiring connectivity to a public radio access network (RAN) or core network.

20 Claims, 12 Drawing Sheets

(51) Int. Cl.
*H04W 88/04* (2009.01)
*H04W 88/08* (2009.01)
*H04W 92/10* (2009.01)

(56) References Cited

U.S. PATENT DOCUMENTS

| | | | |
|---|---|---|---|
| 10,404,654 B1* | 9/2019 | Velusamy | H04L 61/2015 |
| 10,555,357 B1* | 2/2020 | Sharma | H04L 45/16 |
| 10,595,354 B1* | 3/2020 | Zhou | H04W 76/11 |
| 10,630,543 B1* | 4/2020 | Wei | H04W 4/70 |
| 2014/0286328 A1 | 9/2014 | Elgarisi | |
| 2014/0335791 A1 | 11/2014 | Kim et al. | |
| 2014/0341121 A1 | 11/2014 | Chang et al. | |
| 2015/0095097 A1 | 4/2015 | DeJardine et al. | |
| 2016/0044099 A1 | 2/2016 | Oyman | |
| 2016/0315859 A1 | 10/2016 | Buesker et al. | |
| 2017/0111952 A1* | 4/2017 | Choi | H04L 5/001 |
| 2017/0280493 A1* | 9/2017 | Aminaka | H04W 76/14 |
| 2017/0317931 A1* | 11/2017 | Yang | H04L 61/2069 |
| 2018/0084442 A1 | 3/2018 | Lee et al. | |
| 2018/0088886 A1 | 3/2018 | Virodov | |
| 2018/0124674 A1* | 5/2018 | Vutukuri | H04W 36/30 |
| 2019/0028947 A1* | 1/2019 | Adachi | H04W 60/00 |
| 2019/0058521 A1* | 2/2019 | Bales | H04W 60/00 |
| 2019/0132707 A1 | 5/2019 | Prasad | |
| 2019/0253353 A1* | 8/2019 | Yang | H04W 4/06 |
| 2019/0273773 A1* | 9/2019 | Pattan | H04W 4/02 |
| 2019/0306777 A1* | 10/2019 | Martin | H04W 36/30 |
| 2019/0313439 A1 | 10/2019 | Gupta et al. | |
| 2019/0364459 A1* | 11/2019 | Lee | H04W 40/22 |
| 2020/0084688 A1 | 3/2020 | Mildh et al. | |
| 2020/0084707 A1* | 3/2020 | Kim | H04W 4/90 |
| 2020/0128466 A1* | 4/2020 | Vutukuri | H04W 36/30 |
| 2020/0167120 A1 | 5/2020 | Rakshit et al. | |
| 2020/0178216 A1 | 6/2020 | Huang et al. | |
| 2020/0221298 A1 | 7/2020 | Pan et al. | |
| 2020/0229115 A1 | 7/2020 | Qi | |
| 2020/0245229 A1 | 7/2020 | Horn et al. | |
| 2020/0298975 A1* | 9/2020 | Ma | B64D 11/00155 |
| 2020/0344842 A1* | 10/2020 | Buckley | H04W 4/90 |
| 2020/0374263 A1* | 11/2020 | Majmundar | H04W 84/12 |
| 2021/0212025 A1 | 7/2021 | Selvanesan et al. | |
| 2021/0212030 A1 | 7/2021 | Selvanesan et al. | |
| 2021/0250118 A1 | 8/2021 | Roth-Mandutz et al. | |
| 2021/0250957 A1 | 8/2021 | Roth-Mandut et al. | |
| 2021/0274580 A1* | 9/2021 | Majmundar | H04W 92/20 |

OTHER PUBLICATIONS

Non-Final Office Action received for U.S. Appl. No. 16/419,584 dated Aug. 7, 2020, 323 pages.
Final Office Action received for U.S. Appl. No. 16/419,584 dated Jan. 27, 2021, 139 pages.
Non Final Office Action received for U.S. Appl. No. 16/419,584 dated May 14, 2021, 95 pages.
Office Action dated Aug. 23, 2021 for U.S. Appl. No. 16/419,584, 30 pages.
European Patent Application No. 18197384.3 filed Sep. 27, 2018, 89 pages.

* cited by examiner

PRIVATE LOCAL NETWORK ACCESS, AUTHENTICATION, AND ASSOCIATION FOR 5G OR OTHER NEXT GENERATION NETWORK

TECHNICAL FIELD

This disclosure relates generally to facilitating private local network access. For example, this disclosure relates to facilitating private location network access, authentication and association for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating private local network access is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
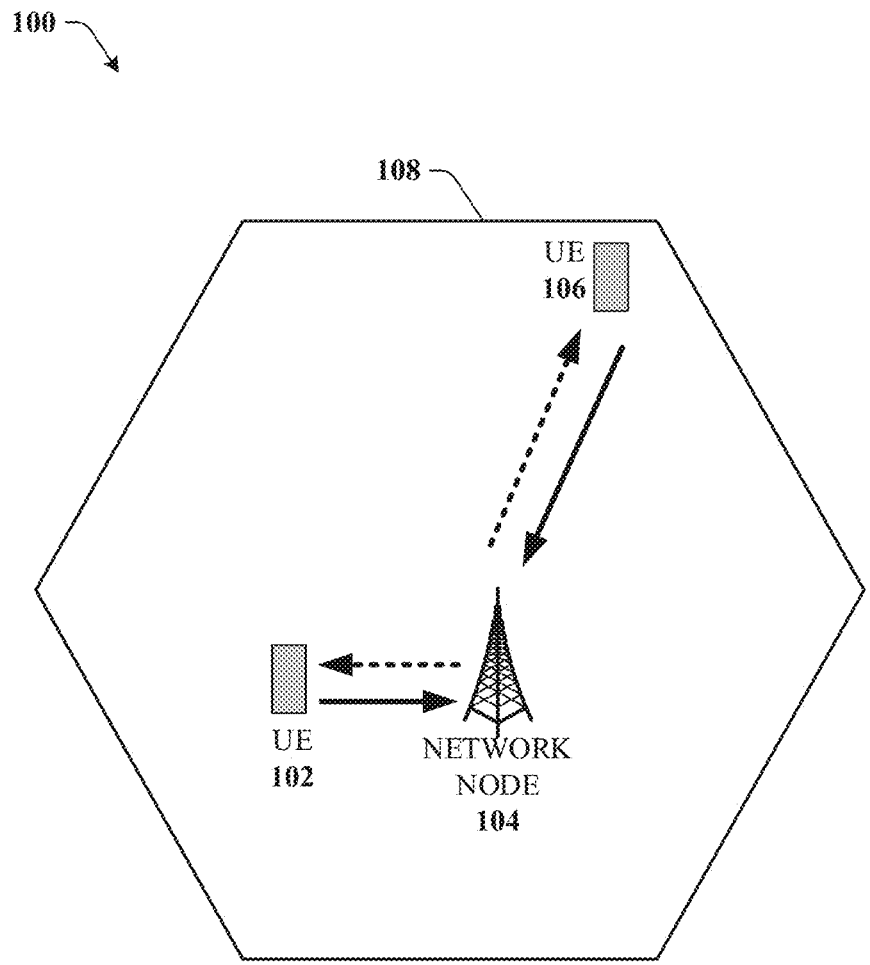
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-Ray Disc™ (BD)); a smart card; a flash memory device (e.g., card, stick, key drive); and/or a virtual device that emulates a storage device and/or any of the above computer-readable media.

As an overview, various embodiments are described herein to facilitate private local network access for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate private local network access for a 5G network. Facilitating private local network access for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

In addition to supporting normal cellular communications (e.g., over a Uu interface) using either a basic NR architecture or integrated access and backhaul (IAB) architecture, 3GPP NR can also support direct peer-to-peer communications using a sidelink interface. This can be used to support use cases such as vehicle-to-everything (V2X) communication and local control in industrial internet-of-things (IoT) settings such as automated factories. In these use cases the traffic carried over sidelink does not require access to a public radio access network (RAN) or core network (CN) (e.g., the regular RAN) to forward and process the traffic. Instead, it is confined to a localized area (e.g. the local RAN), using broadcast, multi-cast, and/or direct communication between authorized devices (e.g., a private network access).

While the use and resource allocation of sidelink can be fully distributed between devices in the local RAN, a more efficient approach can deploy local managers (LM) to provide resource allocation, user association, and/or local routing functionality over the sidelink in a more light-weight fashion compared to cellular connectivity, by not requiring full Uu interface capabilities. Local managers can be mobile access points (e.g., mobile IAB nodes, UEs, etc.) or high-capability UEs, which are preconfigured or selected by the network to manage resources and devices associated with a local RAN. For a local RAN communications an LM can be configured by the regular RAN (e.g., using LTE or NR control signaling on a frequency range (FR1)), while the local data traffic and control signaling is exchanged between devices and the LM over sidelink, potentially on different spectrum (e.g. mmWave FR2 bands). The local managers can be known by the public network even if the public network is not aware of the private access UEs serviced by the local manager.

In another scenario, the UE can access and association can still be managed by the regular RAN and relayed through the LM since both the regular RAN and local RAN are considered as part of the public network deployment using licensed operator spectrum. However, as mentioned previously, certain use cases for V2X/IoT can utilize private and localized communication where control and user plane traffic cannot be shared outside of the local RAN. This disclosure describes a framework for initial access, user authentication, and association management such that the user equipment can engage in peer-to-peer, local breakout, and/or private/public network communication facilitated by a local manager access point, without requiring connectivity to a public radio access network or core network.

Once the initial access and authentication procedure has been completed, the LM can enable the a private access UE to perform either local communication between one more private access UEs, or to have access to the public network via the LM. In order to determine whether traffic from a private access UE should be locally routed or scheduled for another private access UE in the local RAN, or should be routed onto the LM's Uu link to the public network, the LM can utilize RAN signaling such as an ID in a scheduling request message sent by a private access UE.

Alternatively, if the routing is performed at L3 instead of within an L2 protocol stack, the routing of local/private vs. public traffic can be done on the basis of different assigned IP addresses. For example, the LM can assign IP address(es) to private access UEs after the completion of the initial access and authentication procedures described above. The LM can utilize dynamic host configuration protocol (DHCP) functionality to assign IP addresses to private access UEs and can assign multiple independent addresses to the same private access UE on the basis of the support traffic type (e.g., enhanced mobile broadband (eMBB) vs. ultra-reliable low-latency communications (URLLC)) or destination (local/private network traffic vs. public network traffic).

In the case of traffic which is intended for the public network (DL or UL), since the private access UEs do not have an IP address assigned by the public network, but by the LM instead, the LM can act as an open anonymous or transparent proxy to translate the locally assigned IP address to the public network. This has the advantage of enabling the public network to send and receive traffic to/from private access UEs without requiring knowledge of their IP addresses. The LM can further act as a reverse proxy and cache content locally and distribute to the private access UEs without requiring any data to be sent over additional communication links.

Additionally, an advantage of the local RAN is that it can reduce signaling to the regular RAN in case of private access UE association changes from one LM to another (e.g., in case the private access UEs are portable/nomadic or mobile). Thus, if a private access UE moves out of the coverage of one LM into the coverage of a different LM, it can be defined as an association event within the local RAN and does not explicitly impact the regular cellular network.

In one embodiment, described herein is a method comprising terminating, by a wireless network device comprising a processor, a control plane signal of a public network via a cellular interface between a donor unit device and the wireless network device. The method can comprise terminating, by the wireless network device, a user plane signal of the public network via the cellular interface between the donor unit device and the wireless network device. Additionally, the method can comprise facilitating, by the wireless network device, a wireless communication between a private access user equipment device and the public network via a sidelink signal between the private access user equipment device and the wireless network device.

According to another embodiment, a system can facilitate, terminating a control plane signal of a public network via a cellular interface between a first donor unit device of the public network and a wireless network device operable to communicate with a private network and the public network. The system can facilitate terminating a user plane signal of the public network via the cellular interface between a second donor unit device and the wireless network device. Additionally, the system can comprise facilitating a wireless communication between an access user equipment device of the private network and the public network via a sidelink signal between the access user equipment device and the wireless network device.

According to yet another embodiment, described herein is a machine-readable storage medium that can perform the operations comprising terminating a control plane signal of a public network via a cellular interface between a donor unit device of the public network and a first wireless network device operable to communicate with a private network and the public network. The machine-readable storage medium can perform the operations comprising terminating a user plane signal of the public network via the cellular interface between the donor unit device and a second wireless network device. Furthermore, the machine-readable storage medium can perform the operations comprising facilitating transmitting a sidelink signal between the first wireless network device and the second wireless network device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000, etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
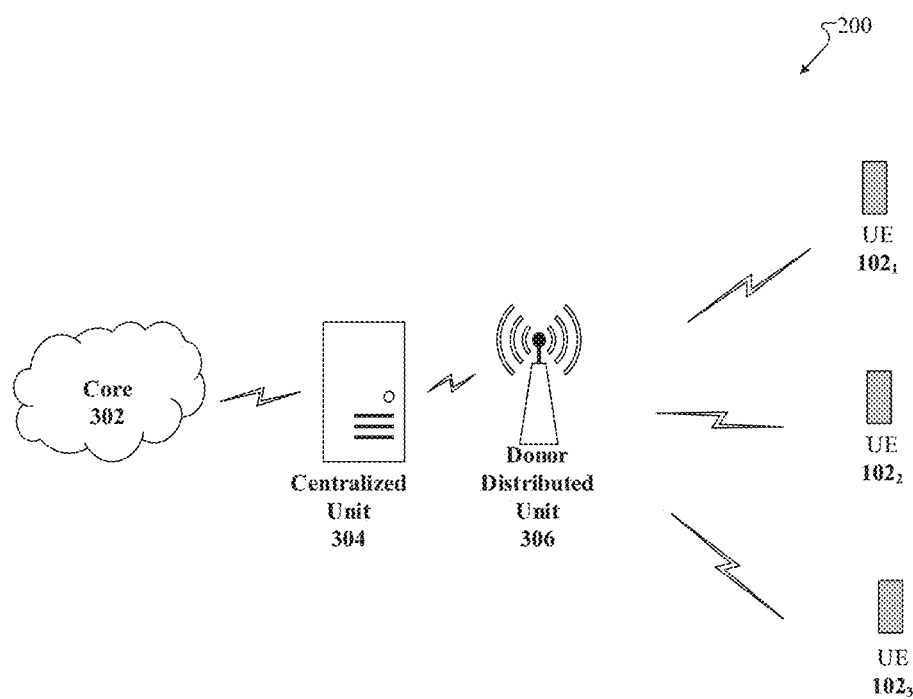
FIG. 2 illustrates an example schematic system block diagram of a new radio access architecture according to one or more embodiments.

Referring now to FIG. 2, illustrated is an example schematic system block diagram 200 of a new radio access architecture according to one or more embodiments. Repetitive description of like elements are omitted for the sake of brevity. 3GPP NR-based 5G mobile networks can be deployed using a split RAN protocol architecture such that on the user plane the packet data convergence protocol (PDCP) sublayers can reside at a centralized unit (CU) 304, while the radio link control (RLC), media access control (MAC), and physical layer (PHY) layers can reside at the distributed unit (DU) 306. User plane data can be carried on data radio bearers (DRBs) that traverse the above described user plane RAN protocol architecture. On the control plane, signaling radio bearers (SRBs) can be set up to carry control messages from the radio resource control (RRC) layer, also utilize the packet data control protocol (PDCP) layer at the CU, and are further carry the control messages down through the RLC, medium access control (MAC), and physical (PHY) layers at the DU 306 to be delivered to the UE 102 over the air interface. Each network user can be allocated multiple DRBs and SRBs by the network. The network interface between the CU 304 and DU 306 can be called the F1 interface per 3GPP specifications.

Figure 3:
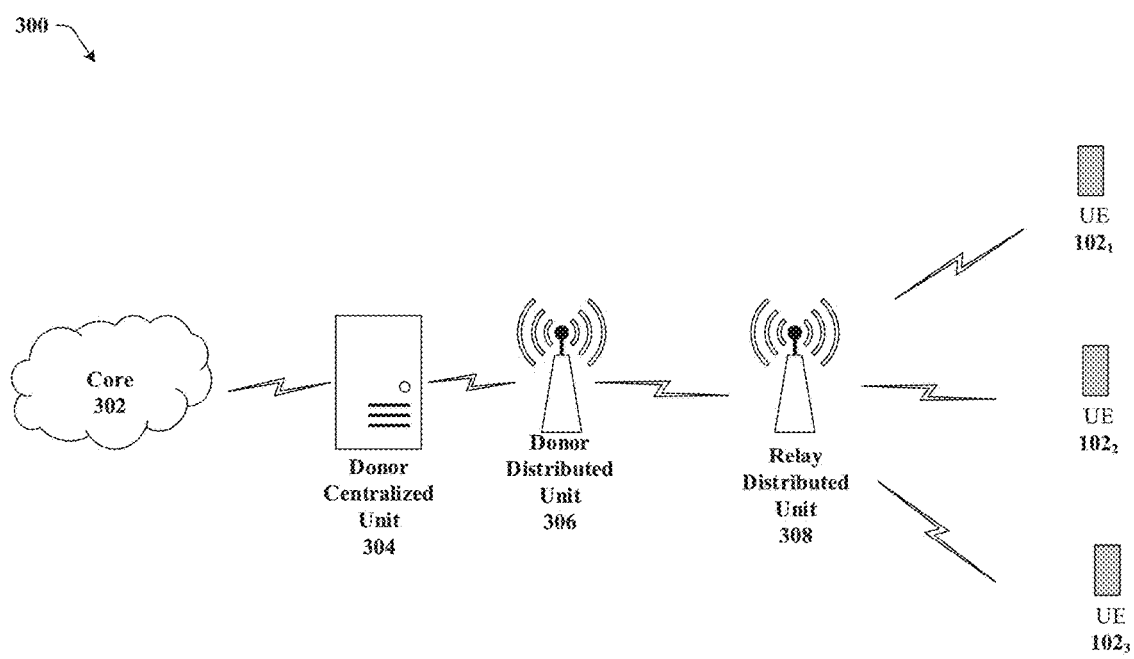
FIG. 3 illustrates an example schematic system block diagram of integrated access and backhaul links according to one or more embodiments.

Referring now to FIG. 3, illustrated is an example schematic system block diagram of integrated access and backhaul links according to one or more embodiments. An IAB feature can enable future cellular network deployment scenarios and applications to the support wireless backhaul and relay links enabling flexible and very dense deployment of NR cells without the need for densifying the transport network proportionately. Repetitive description of like elements are omitted for the sake of brevity.

Due to the expected larger bandwidth available for NR compared to LTE (e.g., mmWave spectrum) along with the native deployment of massive MIMO or multi-beam systems in NR, IAB links can be developed and deployed. This can allow easier deployment of a dense network of self-backhauled NR cells in a more integrated manner by building upon many of the control and data channels/procedures defined for providing access to UEs.

For example, the network 300, as represented in FIG. 3 with integrated access and backhaul links, can allow a relay node to multiplex access and backhaul links in time, frequency, and/or space (e.g., beam-based operation). Thus, FIG. 3 illustrates a generic IAB set-up comprising a core network 302, a centralized unit 304, donor distributed unit 306, relay distributed unit 308, and UEs 1021, 1022, 1023. The donor distributed unit 306 (e.g., access point) can have a wired backhaul with a protocol stack and can relay the user traffic for the UEs 1021, 1022, 1023 across the IAB and backhaul link. Then the relay distributed unit 308 can take the backhaul link and convert it into different strains for the connected UEs 1021, 1022, 1023. Although FIG. 3 depicts a single hop (e.g., over the air), it should be noted that multiple backhaul hops can occur in other embodiments.

Figure 4:
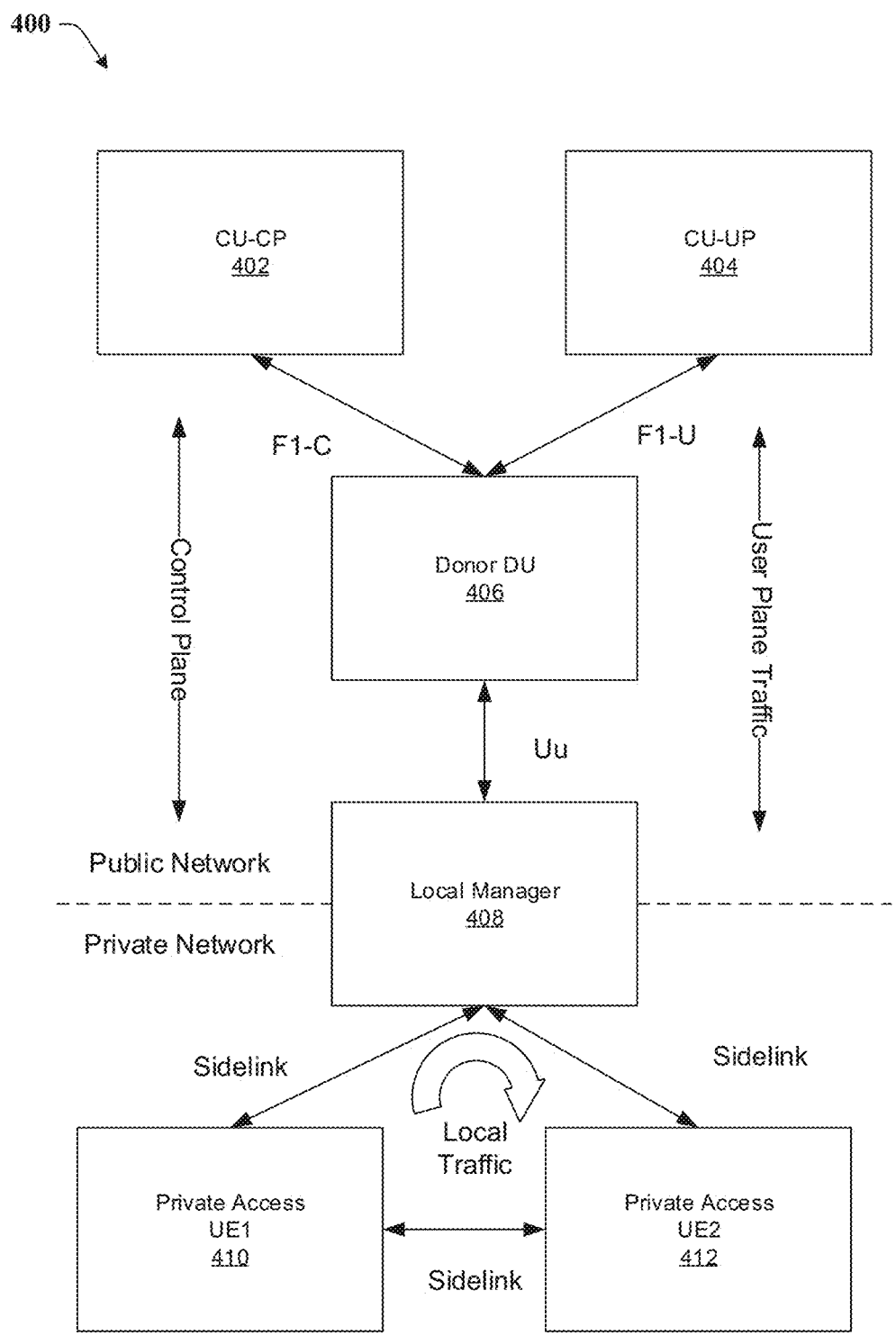
FIG. 4 illustrates an example schematic system block diagram of a private network access with single connectivity according to one or more embodiments.

Referring now to FIG. 4, illustrated is an example schematic system block diagram of a private network access with single connectivity according to one or more embodiments. Repetitive description of like elements are omitted for the sake of brevity.

FIG. 4 depicts an example of a private network 400 with local communication between private access UEs 410, 412 facilitated by a local manager 408, which can be connected to a public network by a cellular (Uu) connection. The local manager 408 can be a fixed or mobile IAB node or special UE with additional functionality to support sidelink and/or local traffic routing and user association. It should be noted that the FIGS. are not limiting. For example, although only two private access UEs 410, 412 are shown, any number of private access UEs are possible.

The LM 408 can terminate the public network control plane (CP) signaling at a centralized unit (CU-CP) 402 and user plane (UP) traffic at a centralized unit (CU-UP) 404 using a regular cellular interface. In addition, the private access UEs 410, 412 can be associated to the LM 408. After the association, the private access UEs 410, 412 can communicate with other private access UEs 410, 412 and the LM 408 to exchange local traffic via sidelink and/or traffic from the public network (e.g., eMBB traffic), which can be relayed via the LM 408 without requiring the private access UEs 410, 412 to have either a control plane (CP) and/or a user plane (UP) connection to the public network.

An advantage of this framework from the private network perspective is that the private access UEs 410, 412 can communicate locally and/or via the public network in a manner which is transparent to the public network. The LM 408 acts as a proxy between the private and public networks and manages the local resource allocation and any required routing of traffic between the private access UEs 410, 412 and the public network. As a result, the identities of the private access UEs 410, 412 are not known outside of the private network and local traffic is not carried over any public network links or interfaces or processed by any public network nodes. At the same time, the LM 408 is able to more efficiently coordinate and utilize radio resources and multiplex of private and public traffic than if the private network was deployed on a separate spectrum and infrastructure from the public network.

From the public network perspective, an advantage of this framework is that since the private access UEs 410, 412 are transparently associated with the LM 408, minimal control signaling is required to manage their connectivity (e.g., due to mobility events) or radio resources, since the LM 408 can implicitly provide those functionalities for the private access UEs 410, 412. In one example, the CU-CP 402 can provide the LM 408 with resource pool configurations for sidelink resource allocation between private access UEs 410, 412. In another example, any mobility events or idle mode procedures (e.g., paging messages) can be managed between the CU-CP 402 and the LM 408 without involving the private access UEs 410, 412. Similarly, data transfer between private access UEs, 410, 412 and the public network can be aggregated in bearers between the LM 408 and the CU-UP 404 instead of requiring dedicated bearers for each individual private access UE 410, 412.

Figure 5:
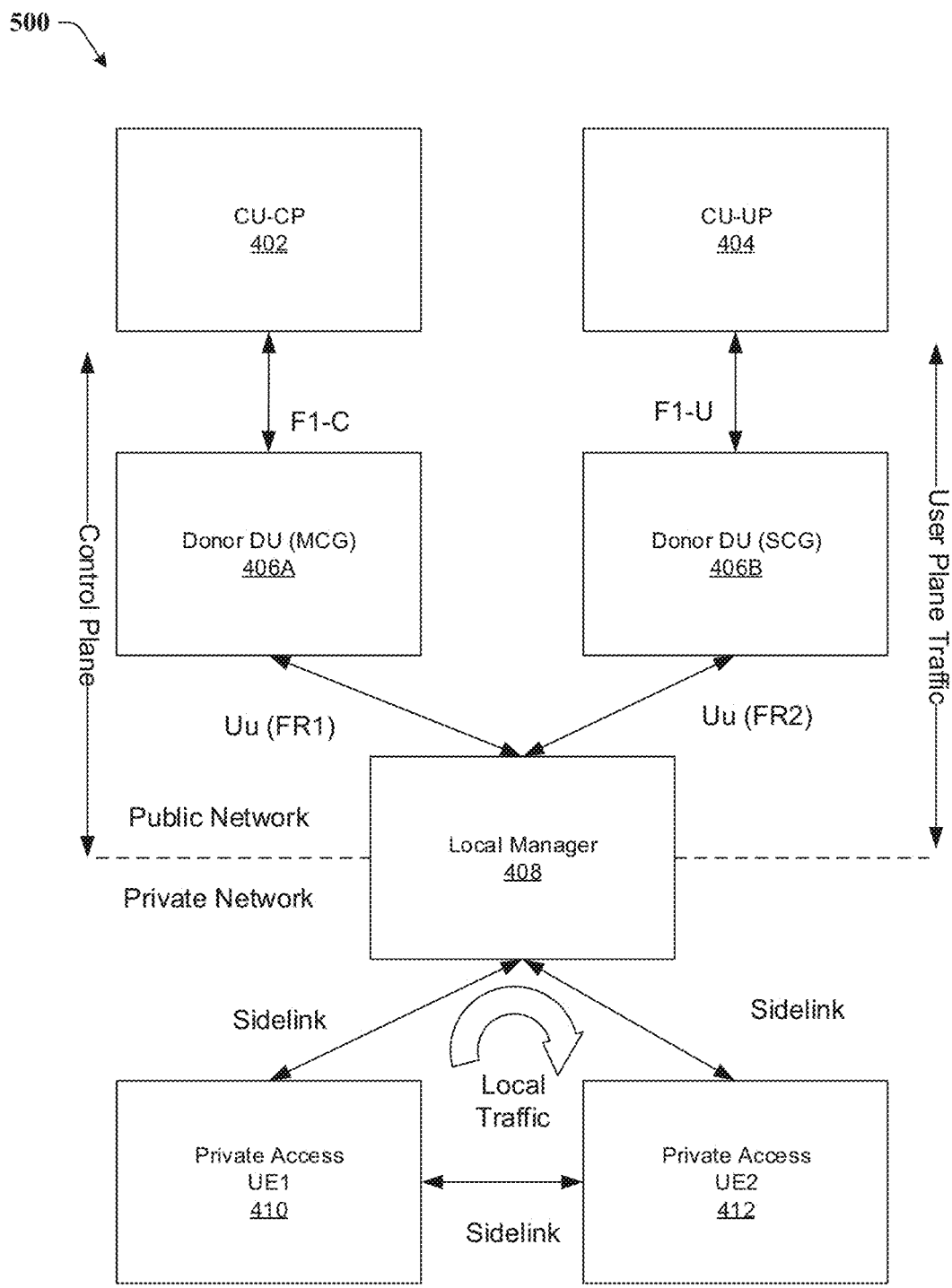
FIG. 5 illustrates an example schematic system block diagram of private network access with multi-connectivity according to one or more embodiments.

Referring now to FIG. 5 illustrates an example schematic system block diagram of private network access 500 with multi-connectivity according to one or more embodiments. Repetitive description of like elements are omitted for the sake of brevity.

Although FIG. 4 depicts an example of single-connectivity between the LM 408 and the public network, multi-connectivity can also be used to provide CP and UP traffic to the LM 408 as shown in FIG. 5. In this case, the NR dual connectivity framework can be used and the LM 408 can be connected to two donor DUs, one which provides CP-related connectivity with a master cell group (MCG) link (e.g., DU (MCG) 406A), and another which provides UP-related connectivity by a secondary cell group (SCG) link (e.g., DU (SCG) 406B). The MCG and SCG links can be on the same or different frequency layers and can use different radio access technologies (RATs) (e.g., LTE for the MCG and NR for the SCG).

While similar advantages as in the single-connectivity case also apply for multi-connectivity, there are additional benefits. In one example, the MCG link, if deployed on FR1 bands, can provide wide-area coverage and manage multiple LMs 408 within the local RAN area. This means that the CU-CP 402 can coordinate the resource allocation for LMs 408 and also utilize broadcast signaling for the configuration of the LMs instead of requiring dedicated connections. In addition, since the CP and UP are provided by separate donors (and potentially frequency layers), the UP can be deployed locally to support low latency or other services requiring CU-UP deployed close to the access points (e.g., edge computing) or even brought within the private network as depicted in FIG. 6.

Figure 6:
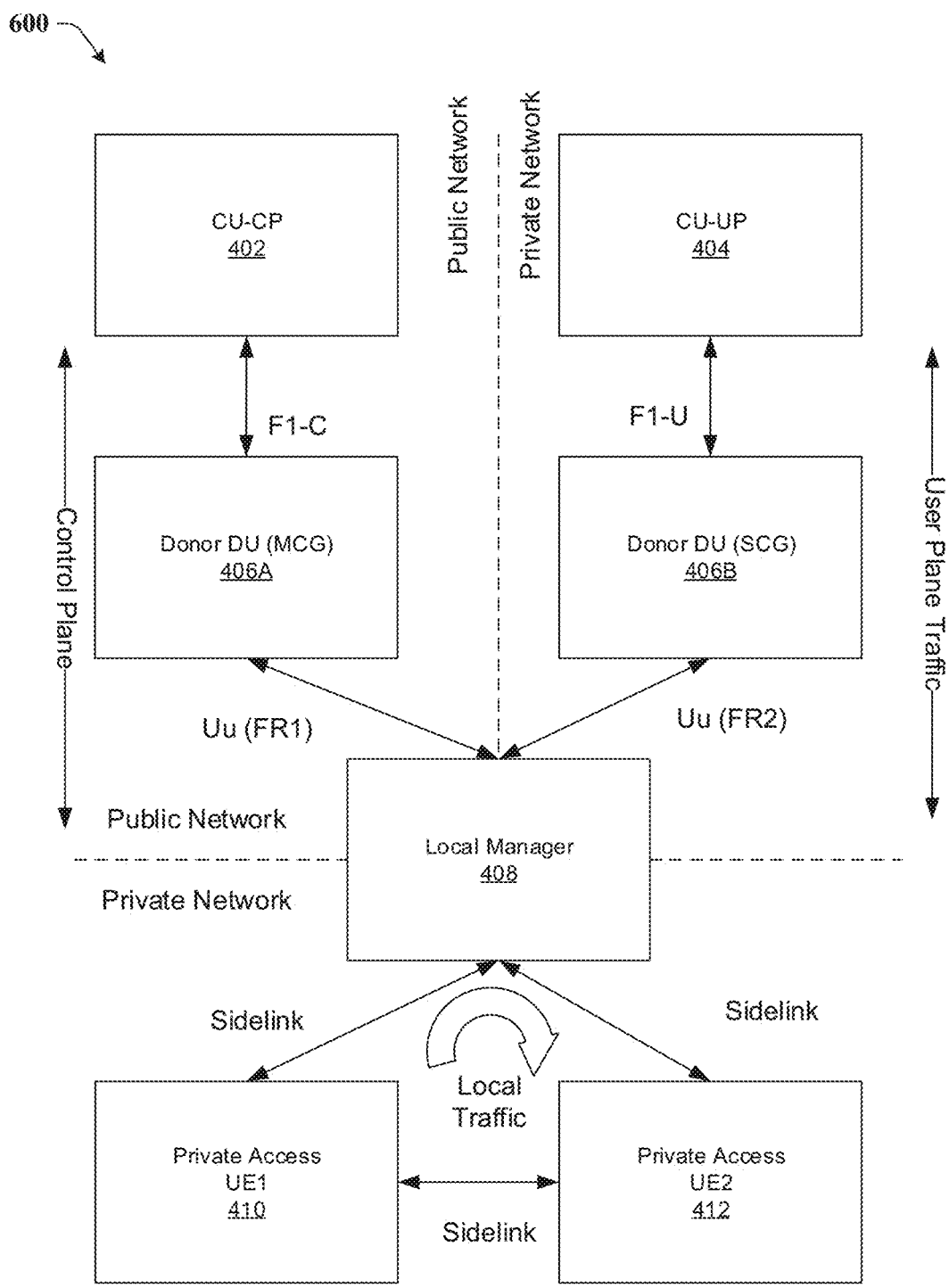
FIG. 6 illustrates an example schematic system block diagram of private network access with a central plane provided by a public network according to one or more embodiments.

Referring now to FIG. 6, illustrated is an example schematic system block diagram of private network access 600 with a central plane provided by a public network according to one or more embodiments. Repetitive description of like elements are omitted for the sake of brevity.

In case of a regular RAN deployment, a UE entering coverage and connecting to the network for the first time can initiate an interface (Uu) between a base station and a UE initial access (e.g., cell search, system information acquisition, and/or random access procedures). However, in the case of a private RAN with local managers 408, the private access UEs 410, 412 do not need to initiate any initial access procedures towards the public cellular network. Instead, the private access UEs 410, 412 can associate with one or more local managers 408 using sidelink procedures, which may not require a full radio resource connection (RRC) connection and associated CN signaling as in the case of a regular cellular connection via Uu.

However, since authentication is also performed by the regular RAN, the LM 408 can have additional capabilities to perform this functionality instead. In one example, authentication can be performed on the basis of a unique device identification (ID) (e.g., international mobile subscriber identity (IMSI) used in SIM cards) along with an authentication key (e.g., a 128-bit number used as part of a two-way encryption process), which can be known by the network and device.

In one embodiment, the LM 408 can comprise a database which stores the IMSI and authentication key values for the authorized public access UEs 410, 412 and can perform the lookup and encryption in the same way as the regular cellular network, except that the signaling can be provided locally over sidelink without involving the regular RAN CU-CP and CN. The database may be preconfigured on the Local Manger or is provided by the public network via Uu signaling.

In a second embodiment, different IDs and keys or encryption processes can be used for private network access and association rather than for the cellular network and can be exchanged via a transparent container over sidelink between the private access UEs 410, 412 and the LM 408. This alternative can provide a benefit wherein the private network can customize the overhead of the authentication signaling and the encryption processing required at the local manager 408 in a transparent manner, which is not defined in cellular standards or known by the public network.

In another embodiment, the LM 408 can forward the authentication information (e.g., ID and key) to the public network either explicitly to an authentication server, which may not reside in the public network. In case of the explicit indication, the LM 408 can request the public network to perform the database lookup and encryption procedures and provide the results of the authentication procedure to the LM 408. This has the benefit of reducing the processing capability at the LM 408 and avoiding potential security attacks at the LM 408 by centralizing the authentication procedure. However, it has the disadvantage that the user identities of the private access UEs 410, 412 are no longer hidden from the public network even though subsequent CP signaling may not come from the CU-CP 404 but is handled by the LM 408 instead.

Additionally, in yet another embodiment, the LM 408 can forward the authentication information (e.g., ID and key) to an authentication server outside of the public network via a tunnel over a normal data bearer. The tunneled approach can avoid the aforementioned disadvantage since the private access UEs 410, 412 ID and key are end-to-end encrypted from the perspective of the public network, with the trade-off of increased latency of initial access, compared to performing the authentication solely at the LM 408.

While the LM 408 does not need to indicate to the public network that a new private access UE 410, 412 has completed the association/authentication procedure, since it is transparent to the public network, the LM 408 can request an update for either CP or UP resources for the LM 408 for serving the new private access UE 410, 412. For example, it can request the cellular network to provide an updated resource pool configuration with additional time/frequency resources to accommodate an additional private access UE 410, 412 on top of the resources, which are sufficient for the existing group of private access UEs 410, 412 managed by the LM 408. In another example, especially if the new private access UE 410, 412 has a different quality of service (QoS) profile compared to other private access UEs 410, 412 in the group, the LM 408 can request a new dedicated bearer to be setup between the LM 408 and CU-UP 404 which has the appropriate QoS profile.

It should be noted that in yet another alternative embodiment, not depicted, the public network can comprise a control plane function and a user plane function. Thus, the DU (MCG) 406A of the public network can communicate with the CU-CP 402 (via F1-C) and another CU-UP (via another F1-U) (e.g., different that the CU-UP 404 of the private network) found within the public network. Thus, control plane and user plane functionality can exists in the public network and/or the private network.

Figure 7:
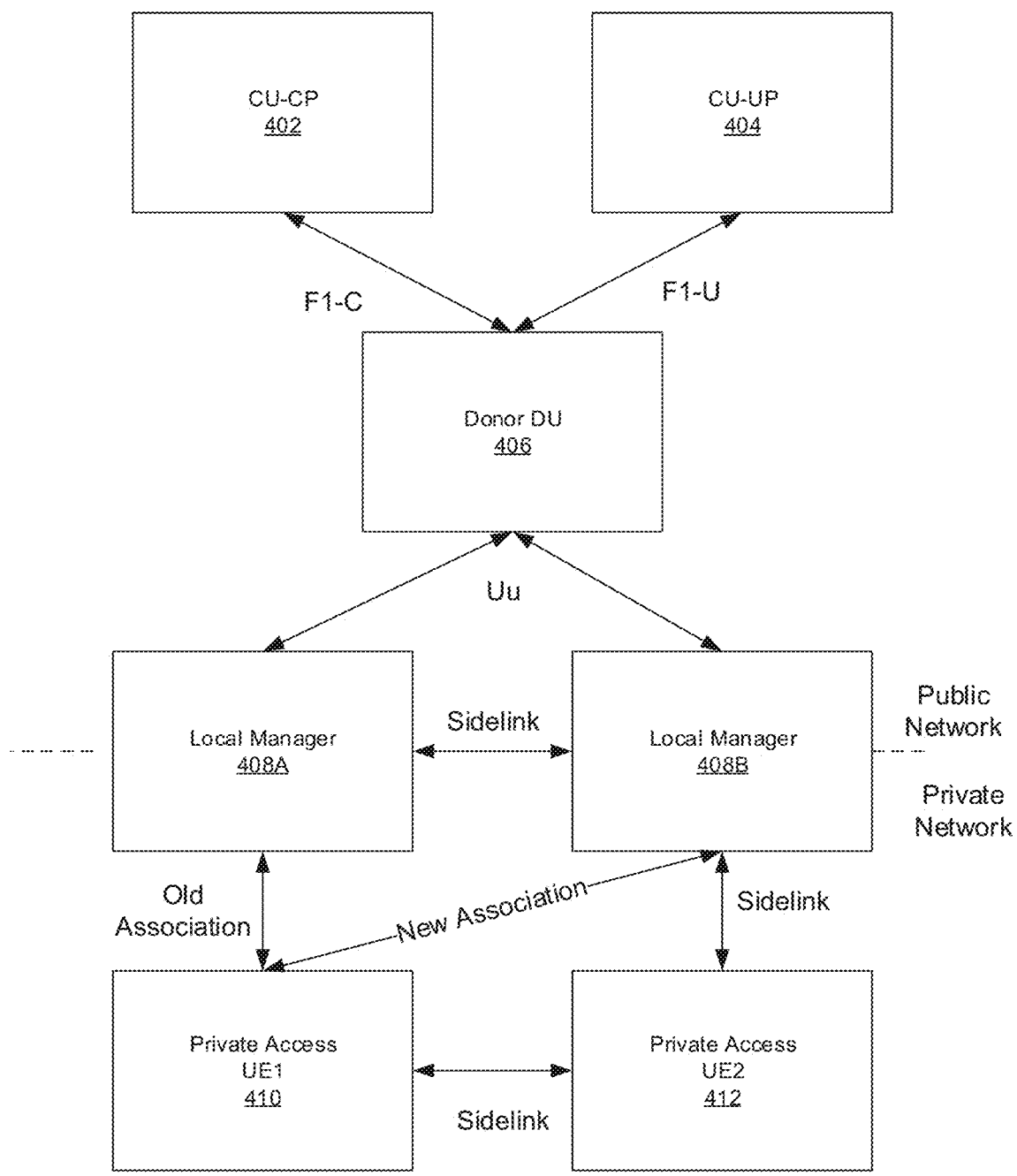
FIG. 7 illustrates an example schematic system block diagram of user association changes within a local private network according to one or more embodiments.

Referring now to FIG. 7, illustrated is an example schematic system block diagram of user association changes within a local private network 700 according to one or more embodiments. Repetitive description of like elements are omitted for the sake of brevity.

The LMs 408A, 408B can exchange authentication information, resource configurations, and internet protocol (IP) address assignments in a distributed manner over sidelink messages if those functionalities are performed in a distributed fashion. Alternatively, the regular cellular network can assist with the exchange of the information between the LMs 408A, 408B via Uu signaling, although it can be transparent to the regular network and carried over cellular data bearers rather than explicit RAN signaling to keep the local RAN control plane data from being exposed to the public network.

In one embodiment, the LMs 408A, 408B can support limited mobility of the private access UEs 410, 412 (e.g., portable/nomadic devices with changes in association over a very long-term timescale), which means that the LMs 408A, 408B only need to update user association information (e.g., user IDs, authorization info, etc.) and potentially also allow for IP address portability across the LMs 408A, 408B to minimize service interruption. In this case, the LMs 408A, 408B do not need to implement many functions related to mobility in a normal cellular network such as radio resource management (RRM), IDLE mode, user context storage/retrieval, and/or lossless data transfer during handover. In addition, the CN does not need to be informed during association changes.

In another embodiment, the LMs 408A, 408B can implement a larger subset or even the full range of mobility-related functionality, for example, if the LMs 408A, 408B are implemented in a similar fashion to a regular infrastructure node such as a gNB or IAB node. However, in this case, it can be beneficial if the public RAN and CN are not directly involved in any private access UE 410, 412 mobility and only need to manage a mobility event if it involves the LMs 408A, 408B connecting with a different serving cell on the public network (e.g., a new Donor DU).

Figure 8:
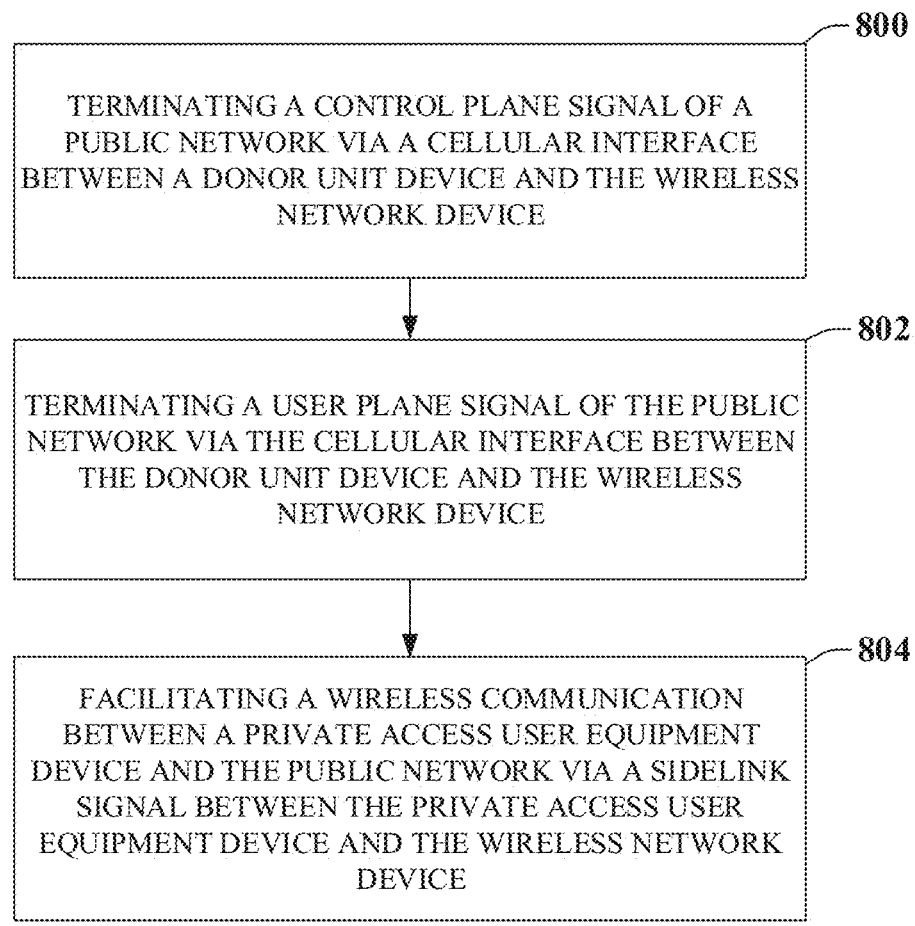
FIG. 8 illustrates an example flow diagram for a method for facilitating a private local network access for a 5G network according to one or more embodiments.

Referring now to FIG. 8, illustrated is an example flow diagram for a method for facilitating a private local network access for a 5G network according to one or more embodiments. At element 800, a method can comprise terminating (e.g., via the LM 408) a control plane signal of a public network via a cellular interface between a donor unit device (e.g., donor DU 406) and the wireless network device (e.g., the LM 408). At element, 802, the method can comprise terminating (e.g., via the LM 408) a user plane signal of the public network via the cellular interface between the donor unit device (e.g., donor DU 406) and the wireless network device (e.g., the LM 408). Additionally, at element 804, the method can comprise facilitating (e.g., via the LM 408) a wireless communication between a private access user equipment device (e.g., private access UE 410) and the public network via a sidelink signal between the private access user equipment device (e.g., private access UE 410) and the wireless network device (e.g., the LM 408).

Figure 9:
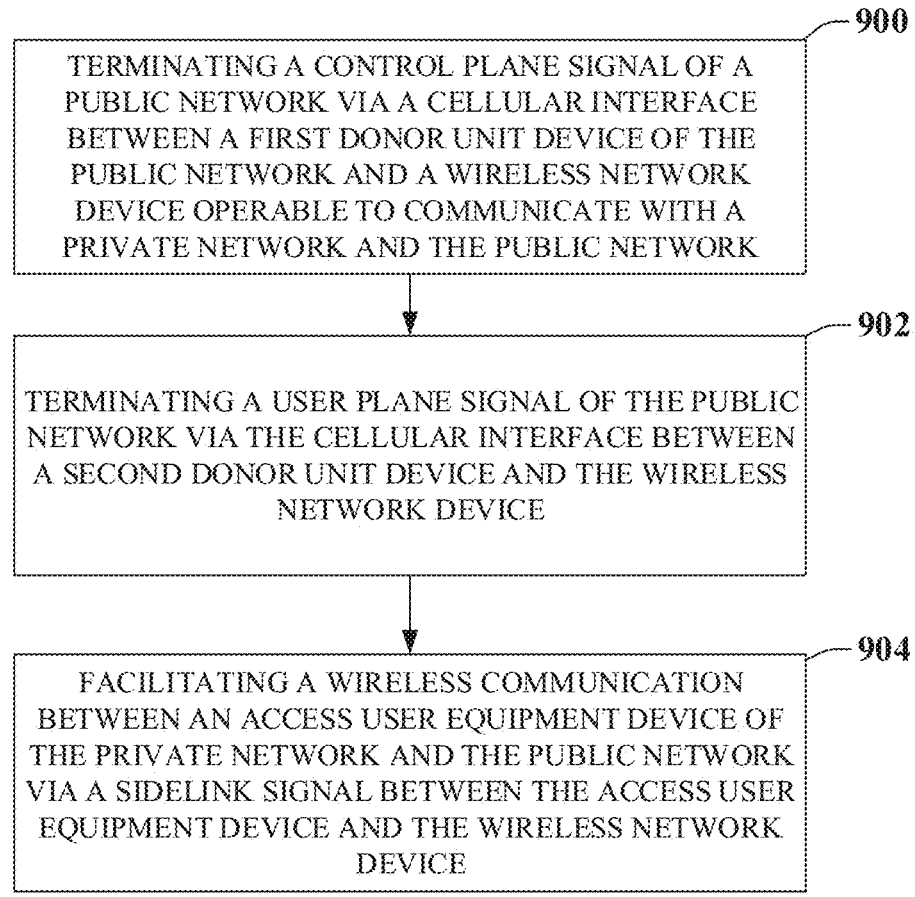
FIG. 9 illustrates an example flow diagram for a system for facilitating a private local network access for a 5G network according to one or more embodiments.

Referring now to FIG. 9, illustrates an example flow diagram for a system for facilitating a private local network access for a 5G network according to one or more embodiments. At element 900, a system can facilitate, terminating (e.g., via the LM 408) a control plane signal of a public network via a cellular interface between a first donor unit device (e.g., donor DU 406A) of the public network and a wireless network device (e.g., the LM 408) operable to communicate with a private network and the public network. At element 902, the system can facilitate terminating (e.g., via the LM 408) a user plane signal of the public network via the cellular interface between a second donor unit device (e.g., donor DU 406B) and the wireless network device (e.g., via the LM 408). Additionally, at element 904, the system can comprise facilitating (e.g., via the LM 408) a wireless communication between an access user equipment device (e.g., private access UE 410) of the private network and the public network via a sidelink signal between the access user equipment device (e.g., private access UE 410) and the wireless network device (e.g., via the LM 408).

Figure 10:
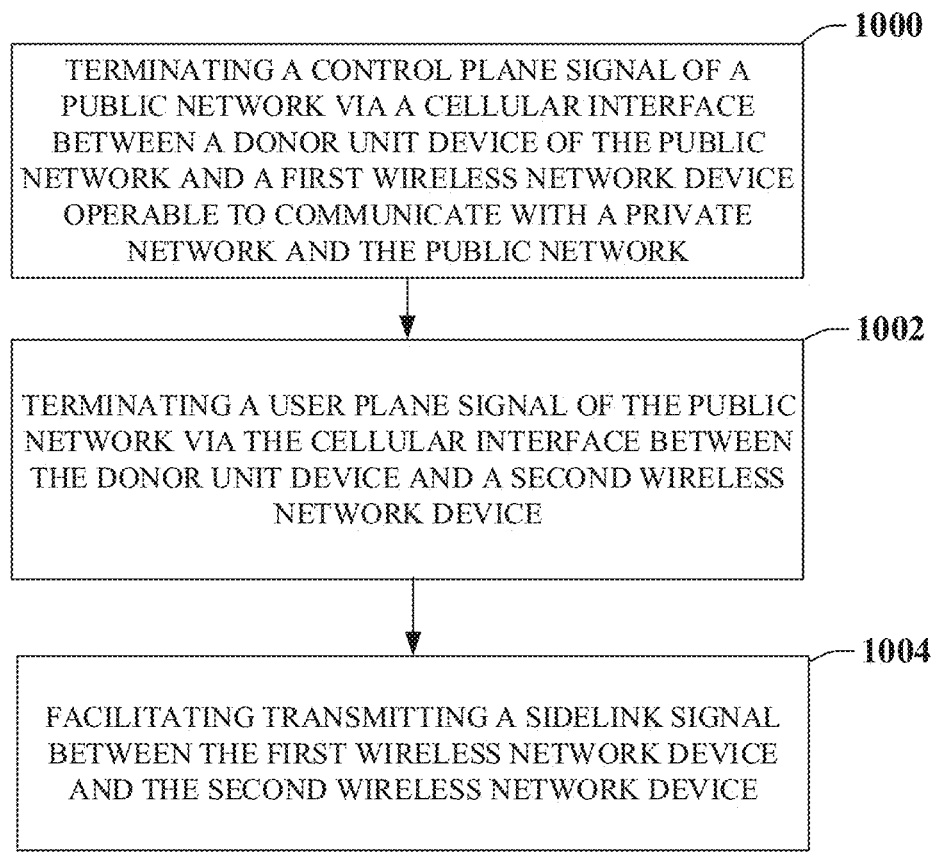
FIG. 10 illustrates an example flow diagram for a machine-readable medium for facilitating a private local network access for a 5G network according to one or more embodiments.

Referring now to FIG. 10, illustrated is an example flow diagram for a machine-readable medium for facilitating a private local network access for a 5G network according to one or more embodiments. A element 1000, a machine-readable storage medium can perform the operations comprising terminating (e.g., via the LM 408) a control plane signal of a public network via a cellular interface between a donor unit device (e.g., donor DU 406) of the public network and a first wireless network device (e.g., the LM 408A) operable to communicate with a private network and the public network. At element 1002, the machine-readable storage medium can perform the operations comprising terminating (e.g., via the LM 408) a user plane signal of the public network via the cellular interface between the donor unit device (e.g., donor DU 406) and a second wireless network device (e.g., the LM 408B). Furthermore, the machine-readable storage medium can perform the operations comprising facilitating transmitting (e.g., via the LM 408) a sidelink signal between the first wireless network device (e.g., the LM 408A) and the second wireless network device (e.g., the LM 408B) at element 1004.

Figure 11:
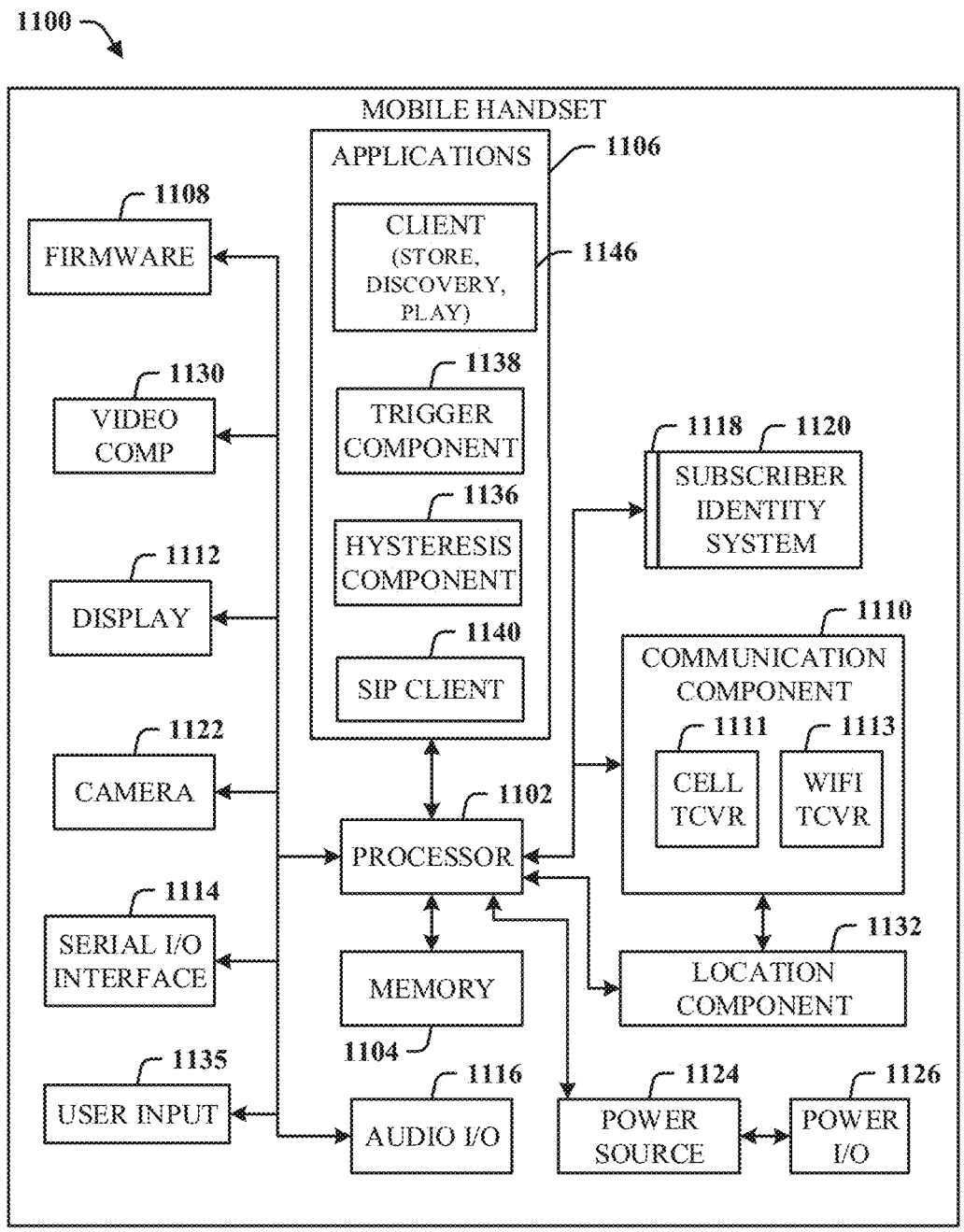
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
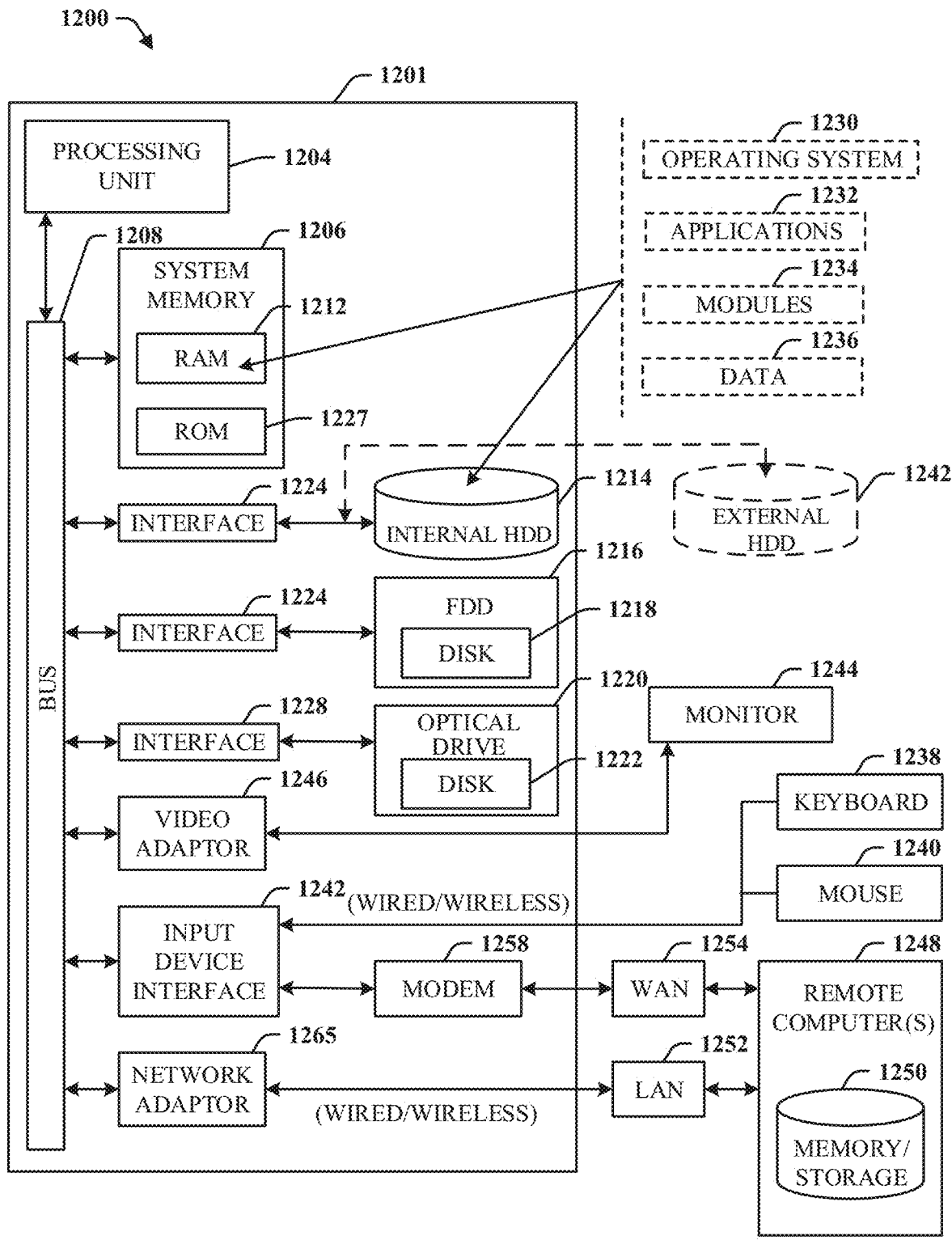
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/ storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    terminating, by local manager network equipment comprising a processor, a control plane signal of public network equipment associated with a public network via a cellular interface between a donor unit device and the local manager network equipment;
    terminating, by the local manager network equipment, a user plane signal of the public network equipment via the cellular interface between the donor unit device and the local manager network equipment;
    facilitating, by the local manager network equipment, a communication between private access user equipment and the public network equipment via a sidelink signal between the private access user equipment and the local manager network equipment;
    in response to facilitating the communication and based on an enhanced mobile broadband traffic type, assigning, by the local manager network equipment, multiple internet protocol addresses to the private access user equipment, wherein assigning the multiple internet protocol addresses comprises utilizing a dynamic host configuration protocol to assign the multiple internet protocol addresses;
    in response to assigning the multiple internet protocol addresses to the private access user equipment, translating, by the local manager network equipment, the multiple internet protocol addresses to the public network equipment, wherein translating the multiple internet protocol addresses to the public network equipment enables the public network equipment to send data packets to the private access user equipment;
    in response to receiving content data, representative of content, from the public network equipment, caching, by the local manager network equipment, the content data; and
    in response to caching the content data, sending, by the local manager network equipment, the content data to the private access user equipment; and
    in response to the private access user equipment transitioning beyond a coverage area of the local manager network equipment, reducing, by the local manager network equipment, a number of signals from the local manager network equipment to base station equipment absent a connection between the public network equipment and the private access user equipment.

2. The method of claim 1, wherein the private access user equipment is a first private access user equipment, wherein the communication is a first communication, and wherein the sidelink signal is a first sidelink signal, and further comprising:
    facilitating, by the local manager network equipment, a second communication between the first private access user equipment and a second private access user equipment via a second sidelink signal.

3. The method of claim 2, further comprising:
    facilitating, by the local manager network equipment, a third communication between the second private access user equipment and the public network equipment via a third sidelink signal between the second private access user equipment and the local manager network equipment.

4. The method of claim 1, wherein the local manager network equipment is a mobile network device.

5. The method of claim 1, further comprising:
    in response to facilitating the communications, managing, by the local manager network equipment, a network resource for the private access user equipment.

6. The method of claim 5, wherein managing the network resource comprises allocating the network resource to the private access user equipment.

7. The method of claim 5, wherein managing the network resource comprises routing network traffic between the private access user equipment and the public network equipment.

8. A system, comprising:
    a processor; and
    a memory that stores executable instructions that, when executed by the processor, facilitate performance of operations, comprising:

terminating a control plane signal of public network equipment associated with a public network via a cellular interface between a first donor unit device of the public network equipment and network equipment operable to communicate with private network equipment associated with a private network and the public network equipment;

terminating a user plane signal of the public network equipment via the cellular interface between a second donor unit device and the network equipment;

facilitating a communication between an access user equipment of the private network equipment and the public network equipment via a sidelink signal between the access user equipment and the network equipment;

in response to facilitating the communication and based on enhanced mobile broadband traffic, assigning internet protocol addresses to the access user equipment, wherein assigning the internet protocol addresses comprises utilizing a dynamic host configuration protocol to assign the internet protocol addresses;

in response to assigning the internet protocol addresses to the access user equipment, translating an internet protocol address, of the internet protocol addresses, to the public network equipment, wherein translating the internet protocol address to the public network equipment enables the public network equipment to receive data packets from the access user equipment;

in response to receiving content data, representative of content, from the public network equipment, caching the content data;

based on caching the content data, sending the content data to the access user equipment; and in response to the private network equipment being determined to be outside of a coverage range of the network equipment, reducing a number of signals from the network equipment to base station equipment absent a connection between the public network equipment and the access user equipment.

9. The system of claim 8, wherein the operations further comprise:
coordinating resources between the public network equipment and the private network equipment via the network equipment.

10. The system of claim 8, wherein the access user equipment is a first access user equipment, wherein the sidelink signal is a first sidelink signal, and wherein the operations further comprise:
facilitating communication between the first access user equipment and a second access user equipment via a second sidelink signal between the first access user equipment and the second access user equipment.

11. The system of claim 8, wherein the private network equipment comprises a first user plane function, wherein the public network equipment is first public network equipment, and wherein the first public network equipment comprises a first control plane function and a second user plane function.

12. The system of claim 11, wherein the first donor unit device is associated with the first control plane function and the second user plane function.

13. The system of claim 11, wherein the second donor unit device is associated with the first user plane function.

14. The system of claim 8, wherein the operations further comprise:
performing, by the network equipment, an authentication of the access user equipment.

15. The system of claim 14, wherein the authentication is based on an international mobile subscriber identity.

16. A non-transitory machine-readable medium, comprising executable instructions that, when executed by a processor, facilitate performance of operations, comprising:
terminating a control plane signal of a public network via a cellular interface between a donor unit device of the public network and first network equipment operable to communicate with a private network and the public network;

terminating a user plane signal of the public network via the cellular interface between the donor unit device and second network equipment;

facilitating transmitting a sidelink signal between the first network equipment and the second network equipment;

in response to facilitating transmitting of the sidelink signal and based on enhanced mobile broadband traffic, assigning internet protocol addresses to a private access user equipment, wherein assigning the multiple internet protocol addresses comprises utilizing a dynamic host configuration protocol to assign the multiple internet protocol addresses;

in response to assigning the multiple internet protocol addresses to the private access user equipment, translating the multiple internet protocol addresses to the public network, wherein translating the multiple internet protocol addresses to the public network enables the public network to receive data packets from the private access user equipment;

in response to receiving multimedia content data, representative of multimedia content, from the public network equipment, caching the multimedia content data;

in response to caching the multimedia content data, sending the multimedia content data to the private access user equipment; and in response to the private access user equipment transitioning beyond a coverage area of the first network equipment, reducing a number of signals sent from the first network equipment to base station equipment from a first number of signals to a second number signals less than the first number of signals absent a connection between the public network equipment and the private access user equipment.

17. The non-transitory machine-readable medium of claim 16, wherein the sidelink signal is a first sidelink signal, and wherein the operations further comprise:
facilitating generating a second sidelink signal between the second network equipment and the private access user equipment.

18. The non-transitory machine-readable medium of claim 17, wherein the private access user equipment is first private access user equipment, and wherein the operations further comprise:
facilitating generating a third sidelink signal between the second network equipment and second private access user equipment.

19. The non-transitory machine-readable medium of claim 16, wherein the operations further comprise:
facilitating exchanging authentication data, associated with the private access user equipment, between the first network equipment and the second network equipment.

20. The non-transitory machine-readable medium of claim 19, wherein the authentication data is exchanged via the sidelink signal between the first network equipment and the second network equipment.

\* \* \* \* \*